Patented June 3, 1952

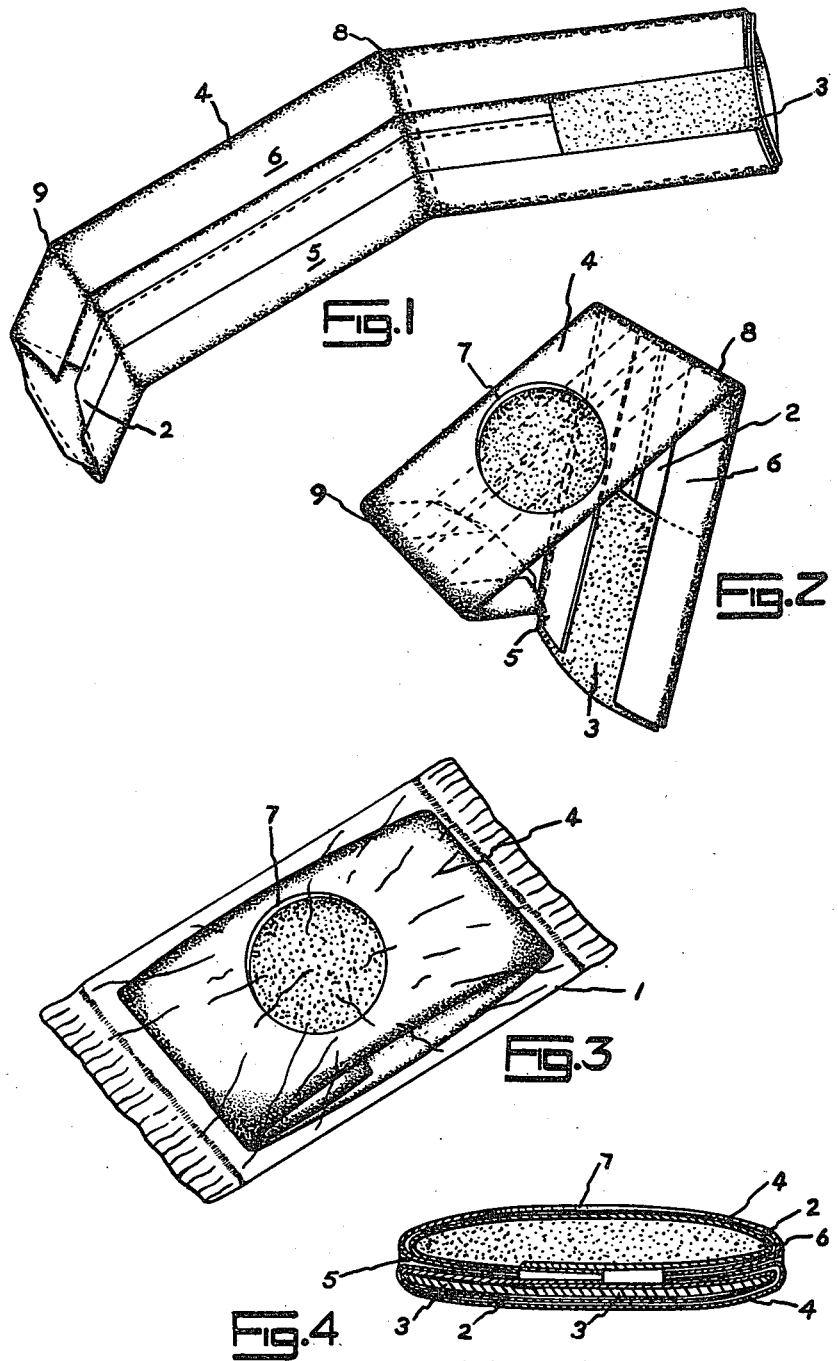

2,598,823

UNITED STATES PATENT OFFICE 2,598,823

INHALANT PREPARATION

Austin Peter Joseph O'Grady, Lindfield, near Sydney, New South Wales, Australia

Application November 29, 1948, Serial No. 62,554
In Australia December 4, 1947

1 Claim. (Cl. 21—117)

This invention relates to inhalant preparations and more particularly to an inhalant preparation which includes an exothermic reaction mixture.

It is common practice, when inhaling, to place the inhalant in a basin and add very hot or boiling water. The inhalant is thereby vaporised and carried to the nostrils by the steam rising from the basin. This method necessitates a supply of hot water which is not always readily available.

Therefore it is an object of the present invention to provide an inhalant preparation which is readily available for use at any time and which does not require a supply of hot water.

It is well known that certain types of chemical reactions are exothermic in nature, that is, the reaction proceeds with the evolution of heat. The following are examples of this type of reaction:

(1) Neutralisation
(2) Hydration
(3) Oxidation and reduction

Any suitable mixture of chemicals which, when mixed with water, will give rise to a reaction or reactions with evolution of heat is usually known as an exothermic reaction mixture. It will be realised, of course, that heats of formation and solution may also contribute to the exothermic nature of these reactions.

According to the present invention an inhalant preparation comprises an exothermic reaction mixture associated with an inhalant.

The inhalant preparation is made up by mixing a suitable inhalant and a suitable reaction mixture. In one form of the invention suitable quantities of the preparation after having been thoroughly mixed are wrapped in small water absorbent sachets preferably made of paper. The sachet containing the preparation is then ready for use.

When required, the sachet is dipped into water for approximately 10 seconds and is then placed on a plate or some other suitable receptacle. Within a very short time heat is evolved and the water and inhalant volatilised. The steam thus generated carries the inhalant upwards from the plate and the mixture of steam and inhalant may be inhaled. If the sachet does not absorb enough water in the first instance to provide a sufficient quantity of steam and inhalant, it may be dipped into the water a second, and, if necessary, a third time, until all the preparation has been used.

Suitable inhalants for the purposes of the present invention are menthol, camphor, ephedrin, amphetamine sulphate, adrenalin, creosote and tincture benzoin composita (Friar's balsam).

An exothermic reaction mixture which may be used in conjunction with any of the above inhalants comprises

| | Per cent |
|---|---|
| Powdered magnesium | 4 |
| Oxalic acid | 18 |
| Fuller's earth | 27 |
| Potassium chlorate | 13 |
| Copper (cupric) oxide | 20 |
| Aluminium filings (100 mesh) | 18 |

It will be understood that in selecting the particular exothermic reaction mixture and the particular inhalant, care must be taken to avoid any compounds which will react together and give rise to obnoxious odours.

Another exothermic reaction mixture which has been found suitable, and which depends upon an oxidation-reduction process for the generation of heat, is:

| | Parts |
|---|---|
| Aluminium filings | 4 |
| Copper sulphate (anhydrous) | 2 |
| Potassium chlorate | 6 |
| Iron filings | 2 |
| Fuller's earth | 8 | where all parts are by weight. A certain amount of heat is also generated by hydration. The speed of the reaction can be varied by varying the proportion of anhydrous copper sulphate.

Examples of inhalants which may be added to the exothermic reaction mixture are:

Example 1

| | |
|---|---|
| Menthol | 10 grains |
| Oil of eucalyptus | 10 minims |
| Tincture of benzoin composita | 1 ounce |

Example 2

| | |
|---|---|
| Camphor | 10 grains |
| Menthol | 10 grains |
| Ethyl alcohol | 1 ounce |

Example 3

| | |
|---|---|
| Menthol | 10 grains |
| Oil of Siberian fir | 5 minims |
| Ethyl alcohol | Up to 1 ounce |
| Tincture of benzoin composita | Up to 1 ounce |

Example 4

| | |
|---|---|
| Methyl salicylate | 5 minims |
| Camphor | 5 grains |
| Menthol | 5 grains |
| Ethyl alcohol | 1 ounce |

Example 5

Oil of cinnamon _____ 2 minims
Oil of peppermint _____ 10 minims
Tincture of benzoin composita ____ 1 ounce Each sachet may contain approximately 8 grams of reaction mixture and 0.5 gram of inhalant. However the quantities can be varied according to requirements.

Reference will now be made to the accompanying drawings in which:

Figures 1 to 4 illustrate a sachet suitable for use with this invention.

A completed sachet ready for marketing is shown in Figure 3. A section taken vertically through the center of Figure 3 looking towards the right of this sachet after it has been removed from its transparent rubber film wrapping 1 is shown in Figure 4. The sachet, before filling, is shown in Figure 1; in Figure 2 it is shown partly folded.

The sachet comprises a flat tube of porous paper 2 formed by folding a narrow length of paper and pasting the overlapping edges together. One end of this tube is pasted to a flat strip of cardboard 3 which imparts sufficient rigidity to the sachet for it to withstand handling. A length of paper 4, substantially equal in length to the overall length of the tube 2 and cardboard strip 3 is folded around the tube 2 and strip 3 and one edge 5 is pasted thereto, the other edge 6 being left unpasted. This paper 4 is a filled paper which will offer resistance to the passage of water and steam. A circular opening 7 is provided in the face of the paper strip 4 as shown. During manufacture the assembly is folded along the lines 8, 9 providing a center portion, and two end portions, one equal in length to, and the other shorter than, the center portion. The opening 7 is provided in the center portion.

The center portion of the tube 2 is filled with the desired amount of exothermic reaction mixture and inhalant, and the assembly bent along the lines 8 and 9. The folded assembly is then enclosed in the inherently waterproof transparent rubber film covering 1 to prevent deterioration when stored.

To use the sachet, the covering 1 is torn away, and the sachet immersed in cold water for 10 seconds and then placed on a plate or the like. Water is absorbed through the porous paper tube 2 during the immersion in cold water, and in a short time heat is generated by the exothermic reaction mixture. Steam issues from the opening 7 and carries the volatilised inhalant along with it.

What is claimed is:

An inhalant sachet comprising a flattened tube of porous paper, an exothermic reaction mixture adapted to generate heat and steam upon addition of water thereto disposed in a central portion of the tube, an inhalant in admixture with the exothermic reaction mixture, a wrapping for the flattened tube made of a material which is substantially impervious to water and steam, the ends of the wrapping and tube being folded back beneath the said central portion, an opening in the wrapping above the said central portion, and a disposable water-proof covering for the sachet.

AUSTIN PETER JOSEPH O'GRADY.

REFERENCES CITED

The following references are of record in the file of this patent:

UNITED STATES PATENTS

| Number | Name | Date |
| --- | --- | --- |
| 1,413,448 | Wintsch | Apr. 18, 1922 |
| 2,239,410 | Bonat | Apr. 22, 1941 |